United States Patent
Akkerman et al.

(10) Patent No.: US 12,318,811 B2
(45) Date of Patent: Jun. 3, 2025

(54) OPTIMIZATION OF AN ACOUSTIC MEMBRANE ARRAY

(71) Applicant: Nederlandse Organisatie voor toegepast-natuurwetenschappelijk onderzoek TNO, 's-Gravenhage (NL)

(72) Inventors: Hylke Broer Akkerman, Rosmalen (NL); Paul Louis Maria Joseph Van Neer, Bergschenhoek (NL); Arno Willem Frederik Volker, Delft (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 550 days.

(21) Appl. No.: 17/630,744

(22) PCT Filed: Aug. 27, 2020

(86) PCT No.: PCT/NL2020/050529
§ 371 (c)(1),
(2) Date: Jan. 27, 2022

(87) PCT Pub. No.: WO2021/040521
PCT Pub. Date: Mar. 4, 2021

(65) Prior Publication Data
US 2022/0260531 A1 Aug. 18, 2022

(30) Foreign Application Priority Data
Aug. 28, 2019 (EP) ..................................... 19194134

(51) Int. Cl.
*B06B 1/06* (2006.01)
*B06B 1/02* (2006.01)
(Continued)

(52) U.S. Cl.
CPC .......... *B06B 1/0688* (2013.01); *B06B 1/0622* (2013.01); *G01N 29/2406* (2013.01);
(Continued)

(58) Field of Classification Search
CPC ... B06B 1/0688; B06B 1/0622; B06B 1/0207; G01N 29/32; G01N 29/2406; G01N 29/262; G01H 11/08
(Continued)

(56) References Cited

U.S. PATENT DOCUMENTS 6,262,946 B1   7/2001   Khuri-Yakub et al.
2005/0219953 A1 * 10/2005 Bayram ................ B06B 1/0292
                                              367/137
(Continued)

FOREIGN PATENT DOCUMENTS

CN         1331901 A     1/2002
CN       107484085 A    12/2017
(Continued)

OTHER PUBLICATIONS

European Patent Office, International Search Report in corresponding International Application No. PCT/NL2020/050529, dated Nov. 23, 2020 (3 pages).
(Continued)

*Primary Examiner* — John E Breene
*Assistant Examiner* — Rose M Miller
(74) *Attorney, Agent, or Firm* — Leydig, Voit & Mayer, Ltd.

(57) ABSTRACT

An acoustic device (100) comprises an array of acoustic membranes (1, 2, 3, 4) formed on a foil (10). Each of the acoustic membranes (1, 2, 3, 4) is configured to vibrate at a resonance frequency (Fr) of the acoustic membranes (1, 2, 3, 4) for generating respective acoustic waves (W1,W2,W3, W4). Relative phases ($\Delta\Phi12, \Delta\Phi34$) are determined at which
(Continued)

the acoustic membranes (1, 2, 4, 5) are actuated for generating a predetermined interference pattern (C) between the acoustic waves (W1,W2,W3,W4). A lamb wavelength ($\lambda s$) is determined of lamb waves (Ws) at the resonance frequency (Fr) travelling through intermediate sections (l0i, l0j) of the foil (10) between adjacent acoustic membranes (1,2; 3,4). Distances (X12,X34) of the intermediate sections (10i, 10j) between the adjacent acoustic membranes (1,2; 3,4) in the layout are determined in accordance with the relative phases ($\Delta\Phi 12, \Delta\Phi 34$) and the lamb wavelength ($\lambda s$) for having the lamb waves (Ws), generated by one acoustic membrane (1,3), arrive in phase with an adjacent acoustic membrane (2,4).

20 Claims, 6 Drawing Sheets

(51) Int. Cl.
  *G01H 11/08* (2006.01)
  *G01N 29/24* (2006.01)
  *G01N 29/26* (2006.01)
  *G01N 29/32* (2006.01)

(52) U.S. Cl.
  CPC ............ *G01N 29/32* (2013.01); *B06B 1/0207* (2013.01); *G01H 11/08* (2013.01); *G01N 29/262* (2013.01)

(58) Field of Classification Search
  USPC .......................................................... 73/641
  See application file for complete search history.

(56) References Cited

U.S. PATENT DOCUMENTS

| | | | | |
|---|---|---|---|---|
| 2014/0117812 | A1* | 5/2014 | Hajati | ................ B06B 1/0276 |
| | | | | 310/314 |
| 2015/0139452 | A1* | 5/2015 | Park | ..................... H04R 23/00 |
| | | | | 381/150 |
| 2021/0396718 | A1* | 12/2021 | Garlepp | ................ H10N 30/87 |

FOREIGN PATENT DOCUMENTS

| | | |
|---|---|---|
| JP | S62271600 A | 11/1987 |
| JP | 2001513619 A | 9/2001 |
| JP | 2012109800 A | 6/2012 |
| JP | 2012216897 A | 11/2012 |
| JP | 2018523936 A | 8/2018 |
| WO | 2014066006 A1 | 5/2014 |
| WO | 2019015882 A1 | 1/2019 |
| WO | WO-2020263082 A1 * | 12/2020 ........... B06B 1/0207 |

OTHER PUBLICATIONS

Chen et al., "A Capacitive Micromachined Ultrasonic Transducer Array for Minimally Invasive Medical Diagnosis," Journal of Microelectromechanical Systems, vol. 17, No. 3, pp. 599-610 (Jun. 2008) XP011215976.

McLean et al., "Capacitive Micromachined Ultrasonic Transducers with Assymetric Membranes for Microfluidic Applications," IEEE Ultrasonics Symposium Proceedings, vol. 2 (2001), pp. 925-928, XP010584662.

Japanese Patent Office, Office Action in corresponding Japanese Application No. 2022-512879 dated Oct. 3, 2024.

China National Intellectual Property Administration, First Office Action in corresponding Chinese Patent Application No. 202080060498.4 dated Mar. 24, 2025.

* cited by examiner

OPTIMIZATION OF AN ACOUSTIC MEMBRANE ARRAY

CROSS-REFERENCE TO RELATED APPLICATIONS

This patent application is a U.S. National Phase of PCT International Application No. PCT/NL2020/050529, filed Aug. 27, 2020, which claims priority to European Application No. 19194134.3, filed Aug. 28, 2019, which are both expressly incorporated by reference in their entireties, including any references contained therein.

TECHNICAL FIELD AND BACKGROUND

The present disclosure relates to acoustic device comprising an array of acoustic membranes, and a method for optimizing the design and manufacturing of such a device.

There is an interest in the construction and miniaturization of multi-element acoustic arrays, e.g. for ultrasonic transducers used in medical diagnostic, non-destructive testing, mid air haptics, and other applications. An important aspect in the design and fabrication of acoustic arrays, is for all the elements, e.g. membranes, to have a pre-defined phase at which they vibrate to achieve optimal focusing. However, inter-element mechanical crosstalk of the elements in the array can diminish performance, e.g. because the actuation of one elementary transducer can also affect adjacent transducers. One way to avoid cross-talk is to add further acoustic insulation between the transducers. However, this may increase fabrication cost and lead to a bulkier design. Another way to avoid cross-talk, is to increase the distance between transducers. However, this also reduces the number of transducers which can fit on a given surface.

There is yet a desire for further improvements in the design and manufacturing of acoustic arrays, e.g. allowing a densely packed array of acoustic membranes on a relatively thin (flexible) substrate, e.g. foil.

SUMMARY

Without being bound by theory, the inventors find that a main source of mechanical cross-talk between adjacent acoustic membranes on a relatively thin substrate or foil can be traced to anti-symmetrical lamb waves travelling through an intermediate section of such substrate. Aspects of the present disclosure are aimed at the design of an acoustic array wherein the intermediate distance between a respective pair of adjacent acoustic membranes is predetermined such that the lamb waves, generated at the resonance frequency of the membranes, and traveling through the intermediate section of the substrate, arrive in-phase with the adjacent membrane. For a pair or adjacent (in-phase) membranes which are configured to vibrate with the same phase, the distance between them is preferably an integer number times the lamb wavelength (optionally allowing a small fractional deviation). In this way, acoustic waves traveling through the substrate may actually enhance actuation of the adjacent transducers. Additionally, or alternatively, some pairs of acoustic transducers may actually be designed to vibrate with a specific phase difference. For example, in a focusing array, it can be desired that transducers which are closer to a focal point of acoustic waves are actuated with a phase delay compared to transducers which are further from the focal point. For a pair or adjacent (phase-delayed) membranes which are configured to vibrate with the relative phase difference, the distance between them is preferably an integer number plus a predetermined fraction times the lamb wavelength. In this case the fraction is selected in accordance with the specific phase difference. For example, the fraction of the wavelength may correspond to a fractional cycle of the phase difference.

In one implementation the design of a membrane transducer array includes characterizing the carrier substrate or foil to determine its material properties. Since the membrane transducers preferably use a specific membrane resonance frequency, a lamb wave dispersion curve for the foil relevant to the required frequency can be determined e.g. from experiment or calculation. For example, the phase difference can be determined by the phase velocity of the dispersive lamb waves and the distance between the individual vibrating membranes. For example, the phase velocity at a specific frequency (resonance of the membranes) can be determined e.g. based on the foil thickness and material properties of the foil (density, Poisson ratio and Young's modulus). Additionally, or alternatively, the phase velocity and/or lamb wavelength in the foil can also be determined experimentally. The array can then be designed such that the lamb waves arrive in phase between the adjacent vibrating membranes (based on the intended phases) to avoid destructive interference.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Figure 1A:
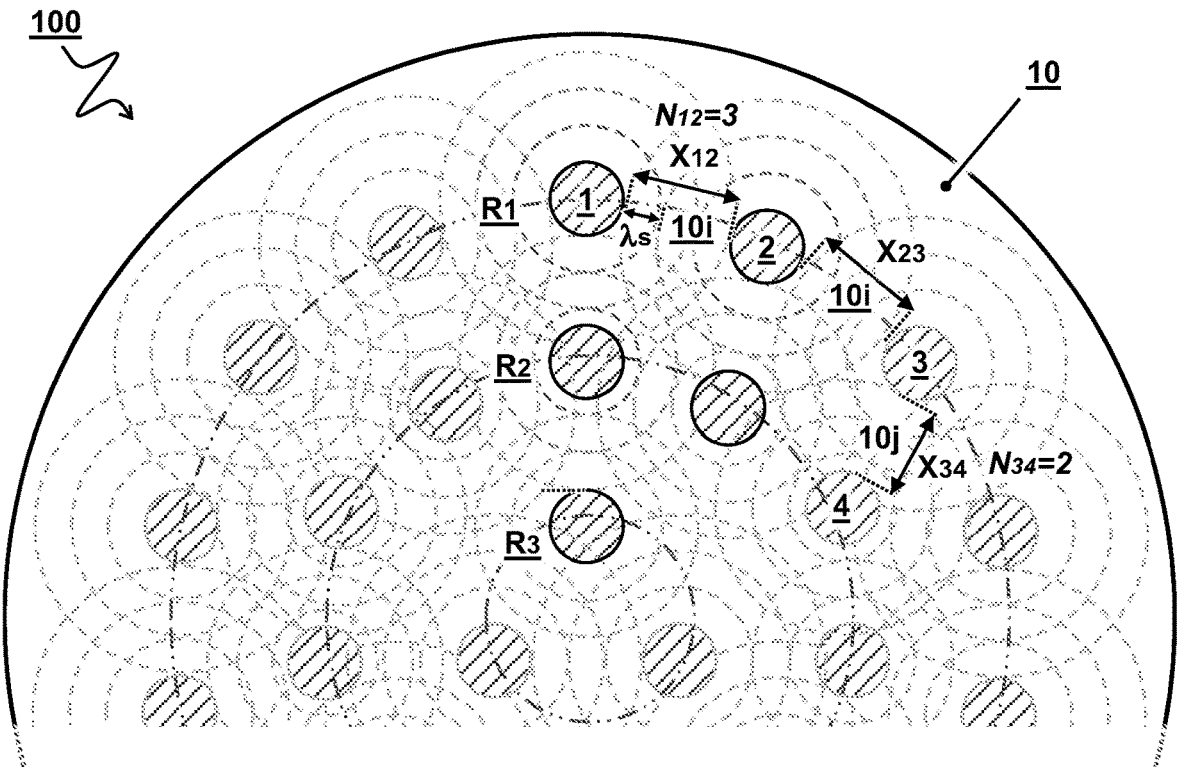
FIG. 1A illustrates a top view of an acoustic device comprising an array of acoustic membranes formed on a foil.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Figure 1B:
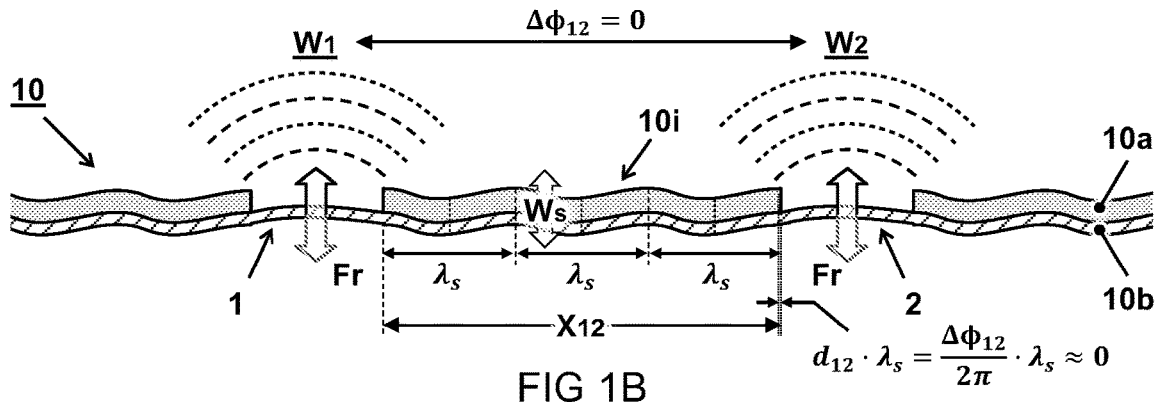
FIG. 1B illustrates a cross-section view of an in-phase pair of transducers.
Figure 1C:
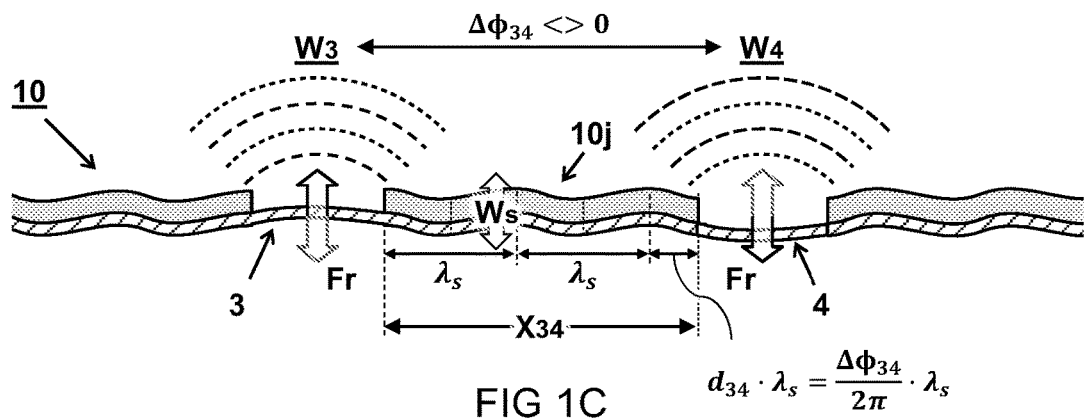
FIG. 1C illustrates a cross-section view of an phase-delayed pair of transducers with a predetermined phase difference.

FIG. 1A illustrates a top view of an acoustic device 100 comprising an array of acoustic membranes 1,2,3,4 formed on a foil 10. FIG. 1B illustrates a cross-section view of an in-phase pair of transducers 1,2. FIG. 1C illustrates a cross-section view of an phase-delayed pair of transducers 3,4 with a predetermined phase difference $\Delta\Phi 13$.

Some aspects of the present disclosure relate to an acoustic device 100 comprising an array of acoustic membranes 1,2,3,4 formed on a foil 10. In a preferred embodiment, each of the acoustic membranes 1,2,3,4 is configured to vibrate at a resonance frequency Fr of the acoustic membranes 1,2,3,4 for generating respective acoustic waves W1,W2,W3,W4.

In some embodiments, at least a first subset of the array is formed by in-phase pairs of adjacent acoustic membranes 1,2. For example, each in-phase pair comprises a respective first acoustic membrane 1 and adjacent, second acoustic membrane 2. In one embodiment, e.g. as shown, the first acoustic membrane 1 is distanced from the second acoustic membrane 2 by a first intermediate section 10i of the foil 10 there between. Preferably, a first distance X12 of the first intermediate section 10i between the first acoustic membrane 1 and the second acoustic membrane 2 is a first integer number N12 times a predetermined lamb wavelength λs of lamb waves Ws generated by the acoustic membranes 1,2 at the resonance frequency Fr traveling through the intermediate section 10i between the adjacent acoustic membranes 1,2.

In some embodiments, a small deviation can be allowed. For example, the distance X12 can be an integer multiple of the lamb wavelength (λs) plus-or-minus a first fraction d12 of less than one-tenth of the lamb wavelength (λs). This can be expressed as $X_{12}=(N_{12}\pm d_{12})\cdot\lambda_s$. To minimize cross-talk interference between the in-phase pair of adjacent membranes 1,2, preferably the fraction d12 is relatively small, e.g. less than one-fifth (<0.2), less than one-tenth (<0.1), less than one-twentieth (<0.05), less than one-fiftieth (<0.02), or even less than one-hundredth (<0.01). Most preferably, the fraction d12 is as low as possible, i.e. zero (within measurement or manufacturing tolerance). The smaller the fraction d12, the less the influence of destructive interference between the pair.

In some embodiments, at least a second subset of the array is formed by phase-delayed pairs of adjacent acoustic membranes 3,4. For example, each phase-delayed pair comprises a third acoustic membrane 3 and an adjacent, fourth acoustic membrane 4. In one embodiment, e.g. as shown, the third acoustic membrane 3 is distanced from the fourth acoustic membrane 4 by a second intermediate section 10j of the foil 10 there between. Preferably, a second distance X34 of the second intermediate section 10j between the third and fourth acoustic membranes 3,4 is a second integer number N34, plus-or-minus a non-zero, second fraction d34, times a predetermined lamb wavelength λs of lamb waves Ws generated by the acoustic membranes 3,4 at the resonance frequency Fr traveling through the intermediate section 10i between the adjacent acoustic membranes 3,4. This can be expressed as $X_{34}=(N_{45}\pm d_{34})\cdot\lambda_s$. Preferably, the second fraction d34 is predetermined in accordance with a phase delay φ34 between the third and fourth acoustic membranes 3,4.

In principle, the integer numbers N12, N34 counting the number of lamb wavelengths fitting between the membranes can have values of one, two, three, four, five, six, seven, eight, nine, ten, etcetera. Preferably though, the distance X12 or X34 between the transducers is kept relatively small. For example, the first integer number N12 and/or the second integer number N34 is preferably less than or equal to three, two, or even one. The smaller the distance between the transducers, the more can fit per surface area of the foil 10. It will be appreciated that especially for relatively small distances, the present teachings can provide benefit in avoiding undesired cross-talk. In some embodiments, it may be desirable to have sufficient distance and material between the transducers to allow at least some isolation there between. Accordingly, it may be desirable to set the integer number to at least one or two.

While in principle the membranes may support different resonant vibrations, preferably the fundamental mode (u01, 1s) with the lowest resonance frequency is used for efficiently generating the acoustic waves. Typically, the resonance frequency Fr is determined, e.g., by one or more of the membrane material properties and diameter of the acoustic membranes. Also other or further parameters can be used, e.g. density, Poisson ratio and Young's modulus. In some embodiments, the fundamental frequency Fr (Hz) can be expressed using the membrane tension T (N/m), density σ (kg/m$^2$), diameter D (m) as Fr=0.766 $\sqrt{T/\sigma}$/D. Alternatively, or additionally, the fundamental frequency of the membranes can be determined by any other analytic or numeric modeling. The lamb wavelength can also be determined experimentally e.g. actuating a piece of the foil at the resonance frequency and recording the waves. In one embodiment, a specific resonance frequency Fr is determined by setting a specific diameter D in relation to the tension and density of the membrane. For example, the diameter D may correspond to half a wavelength at the resonance frequency of waves traveling in the membrane to produce a standing wave.

Typically, the lamb wavelength λs is determined e.g. by the frequency at which the lamb waves Ws are generated (e.g. the resonance frequency Fr of the membranes), as well as material properties and thickness of the intermediate section 10i. Also other or similar parameters can be used, e.g. density, Poisson ratio and Young's modulus of the foil (including the base foil and any further layers). For example, the wavelength can be determined as a function of the phase velocity of the lamb waves (at the resonance frequency) divided by the resonance frequency. Alternatively, or additionally, the fundamental frequency of the membranes can be determined by any other analytic or numeric modeling. Preferably, a distance of the intermediate section between nearest neighbor membranes is between half and two times a diameter of the membranes and fine tuned in accordance with the specifications of relative phases as described herein.

In a preferred embodiment, the acoustic membranes 1,2, 3,4 are formed as an integral part of the foil 10. For example, an actuated surface of the acoustic membranes 1,2,3,4 comprises a layer 10*b* of the foil. For example, intermediate sections 10*i*,10*j* of the foil between the membranes can be provided with one or more further layers 10*a* to provide definition to the edges of the acoustic membranes and/or provide at least some acoustic insulation between the membranes. In some embodiments, the acoustic membranes themselves may comprise further layers (not shown), e.g. a piezoelectric layer sandwiched between respective bottom and top electrode layers. By energizing the piezoelectric layer, e.g. applying voltage across the electrodes, the piezoelectric layer and membrane may deform. For example, an AC voltage signal can be applied to the electrodes wherein the signal includes a frequency component in accordance with the resonance frequency Fr. Actuation of the membranes can also be provided in other ways, e.g. separate transducers.

Typically, the foil 10 is relatively thin. In principle, the foil may be formed by any thin piece of solid material, e.g. having a thickness smaller or on the same order as the wavelength of compressional/shear waves that can be generated in the material (by the transducers). Preferably, the intermediate sections of foil between the membranes have a total thickness (including any further layers 10*a*,10*b*) of less than two millimeter, less than one millimeter, or even less than half a millimeter. The membranes forming respective acoustic transducers can be even thinner, e.g. less than eighty percent of the intermediate sections of foil, preferably less than sixty percent, or even thinner, e.g. at least a factor two or three thinner. In some embodiments, the foil 10 can be relatively flexible, e.g. allowing the foil (including membranes) to be bent over a radius of less than twenty centimeter, less than ten centimeter, or even less than five centimeter, without the acoustic device 100 losing essential (electrical/acoustic) functionality.

In some embodiments, the thickness of the intermediate sections 10*i*,10*j* of the foil 10 may be varied to affect the propagation of lamb waves, e.g. such that the lamb waves arrive in phase with the neighboring membrane. It can also be envisaged to add further thickness or acoustic insulation to intermediate sections between at least some of the transducers that cannot be set at a desired distance and would otherwise destructively interfere with each other. Also combinations are possible, e.g. wherein membranes along a common radius or circle are set at a distance to have the lamb waves constructively interfere, while membranes of different circles are insulated from each other by extra material or clamping of the foil there between.

As described herein, the membranes in the array are preferably distributed in a predetermined layout to avoid destructive interference between adjacent membranes, e.g. wherein the separation distance is determined such that the lamb wave arrives in phase with the vibrating membrane. Aspects of the present disclosure can accordingly be embodied as a method of manufacturing an acoustic device as described herein, or otherwise.

Some embodiments comprise determining a layout for an array of acoustic membranes 1,2,3,4 formed on a foil 10, wherein each of the acoustic membranes 1,2,3,4 is configured to vibrate at a resonance frequency Fr of the acoustic membranes 1,2,3,4 for generating respective acoustic waves W1,W2,W3,W4. Other or further embodiments comprise determining relative phases ΔΦ12,ΔΦ34 at which the acoustic membranes 1,2,4,5 are to be actuated for generating a predetermined interference pattern C between the acoustic waves W1,W2,W3,W4. Other or further embodiments comprise determining a lamb wavelength λs of lamb waves Ws at the resonance frequency Fr traveling through intermediate sections 10*i*,10*j* of the foil 10 between adjacent acoustic membranes 1,2; 3,4 in the array.

Preferably, distances X12,X34 of the intermediate sections 10*i*,10*j* between the adjacent acoustic membranes 1,2; 3,4 in the layout are determined in accordance with the relative phases ΔΦ12,ΔΦ34 and the lamb wavelength λs for having the lamb waves Ws generated by actuating a first acoustic membrane 1,3 of the pair of adjacent acoustic membranes, and traveling through the respective intermediate section 10*i*,10*j*, arrive in phase with a second acoustic membrane 2,4 of the pair of adjacent acoustic membranes. Accordingly, the acoustic device can be manufactured using the determined layout. In one embodiment, optimized distances between the membranes are obtained by varying locations of the membranes to minimize phase differences between the case where the lamb waves arrive for each of the membranes exactly in phase, and an initial layout. For example, a minimizer routine can be used.

Figure 2:
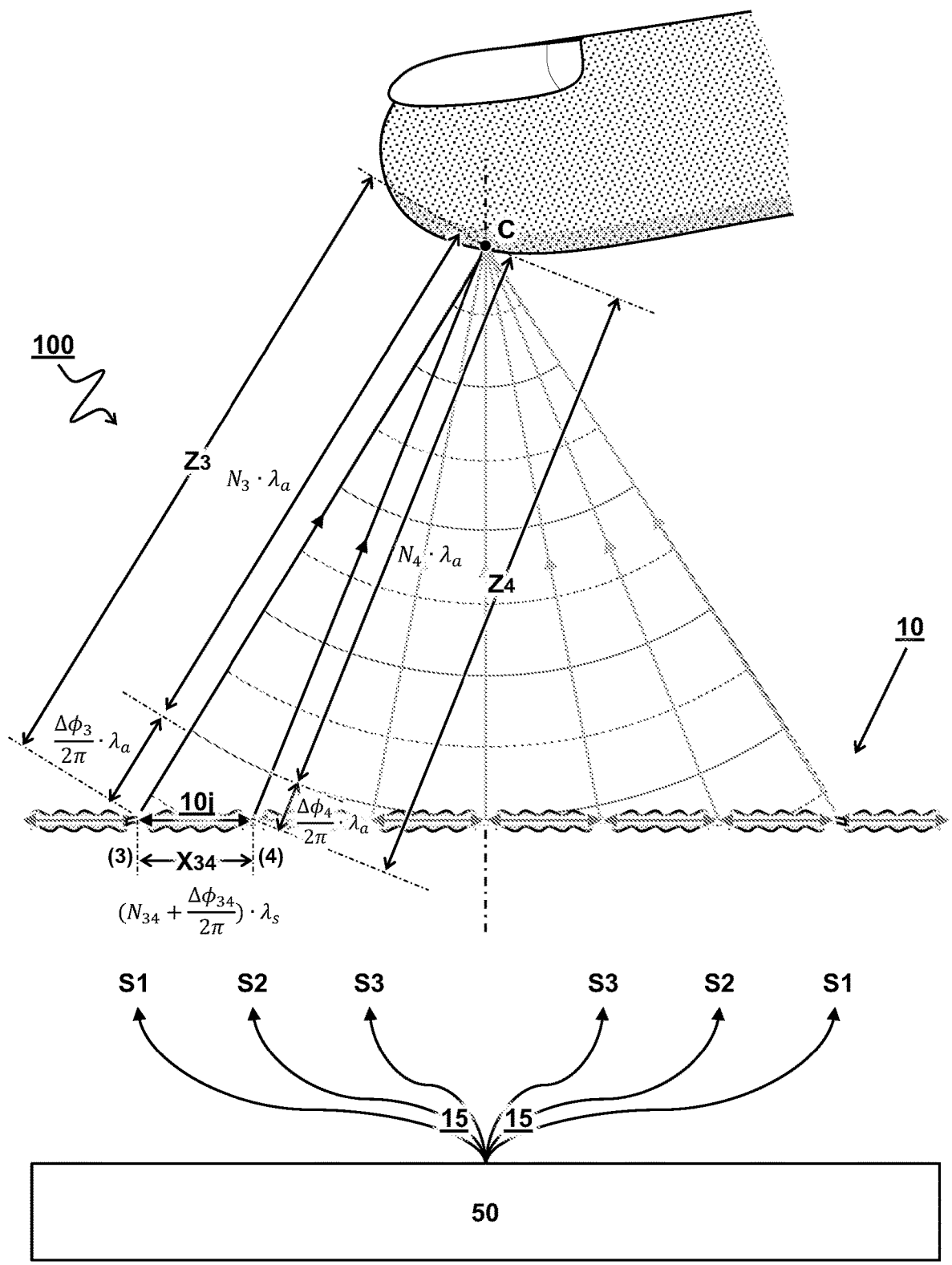
FIG. 2 illustrates a device with an array of acoustic membrane configured to constructively interfere at a predetermined location.

FIG. 2 illustrates a device with an array of acoustic membrane configured to constructively interfere at a predetermined location;

In some embodiments, all or at least a subset of the acoustic membranes are actuated to generate acoustic waves with respective phases to constructively interfere at one or more specific locations above (or below) the foil. For example, the acoustic waves of all membranes are generated with respective phases to constructively interfere at a focal C or a focal line (not shown). For example, the acoustic device 100 forms a haptic feedback device, wherein the membranes are configured to create a tangible point in mid-air above the device by constructive interference between acoustic waves W emitted by the different membranes.

In some embodiments, zero or non-zero phase delays φ12, φ34 between respective pairs of acoustic membranes 1,2; 3,4 (shown e.g. in FIGS. 1B and 1C) are determined such that respective acoustic waves W1,W2,W3,W4 generated by at least some, preferably all, the acoustic membranes 1,2,3,4 constructively interfere at a focal point C above the array. In other or further embodiments, the relative phases of the respective transducers 3,4 can be determined based on the respective distances Z3,Z4 to the focal point C. For example, a first total distance Z3 between the first transducer 3 and the focal point C can be expressed as the sum of an integer N3 times the acoustic wavelength λa (e.g. in air) plus a remaining fractional wavelength. The remaining fraction can be expressed as the ratio of the phase difference ΔΦ3 divided by the full cycle, e.g. expressed as two pi radian (2π rad).

In one embodiment, e.g. as shown, at least some, preferably most, or even all) acoustic membranes 3,4 forming a respective phase delayed-pair of adjacent membranes are (e.g. with the centers) disposed at specific respective distances Z3 and Z4 from a common focal point C above the foil 10 (e.g. when it is laid flat). For example, the distances Z3 and Z4 are determined as $$Z_3 = N_3 + \Delta\Phi_3/2\pi \cdot \lambda_a \text{ and } Z_4 = N_4 + \Delta\Phi_4/2\pi \cdot \lambda_a,$$

where λa is a wavelength of acoustic waves generated by the membranes 3,4, N3 and N4 are integers values determined by a number of full wavelengths fitting between the respective membranes and the focal point, and ΔΦ3 and ΔΦ4 are respective phases of the membranes (in radians);

In another or further embodiment, a distance X34 between the phase delayed-pair of membranes 3,4 is determined by $$X_{34} = N_{34} + \Delta\Phi_{34}/2\pi \cdot \lambda_s$$

where λs is the lamb wavelength λs, N34 is an integer values determined by a number of full wavelengths fitting between the respective transducer and the focal point, and ΔΦ34 is a phase difference (in radians) between the respective phase delayed-pair of membranes 3,4.

Preferably, the distance X34 is selected such that the following equation of the relative phases holds $$\Delta\Phi_{34}/2\pi = |\Delta\Phi_3/2\pi - \Delta\Phi_4/2\pi| \pm d_{34},$$

where d34 is a maximum allowed fractional phase difference between lamb waves generated by one of the phase delayed-pair of membranes 3,4, and arriving at the other of the phase delayed-pair of membranes 3,4. Preferably, the maximum allowed fractional phase difference d34 is less than one fifth, preferably less than one tenth, or as low as possible, e.g. zero, to have minimal destructive interference.

It will be understood that in instances where the phase delay over the distances Z3,Z4 to the point C is more than a full cycle (2n), integer numbers may be added or subtracted, e.g. in the latter sum of phase differences; or the integers N3,N4 can be adjusted, e.g. to be maximal. It may also be noted that similar expressions may trivially hold for in-phase pairs of transducers 1,2 (not shown here) where the distances to the focal point are equal. For example, this can be expressed as $$\Delta\Phi_{12}/2\pi = |\Delta\Phi_1/2\pi - \Delta\Phi_2/2\pi| \pm d_{12} = 0.$$

where d12 is the first fraction or maximum allowed fractional phase difference.

In some embodiments, e.g. as shown, the acoustic device 100 comprises a controller 50 configured to generate respective driving signals S1,S2,S3 to actuate the acoustic membranes in the array. For example, the controller may include a signal generator configured to generate alternating voltages for driving piezoelectric material on the acoustic membranes. In one embodiment, each of the driving signals S1,S2,S3 comprise a respective driving frequency corresponding to the resonance frequency Fr of the membranes. In another or further embodiment, acoustic membranes 1,2 in respective in-phase pairs of the membranes are connected to receive the same driving signal S1. In another or further embodiment, acoustic membranes 3,4 in respective phase-delayed pairs are connected to receive phase-delayed driving signals S1,S2.

While the membranes are preferably actuated with a driving frequency at or near the resonance frequency Fr, also other or further driving frequencies can be used. In some embodiments, the driving signals comprise multiple frequencies including a carrier frequency Fc (as best as possible) corresponding to the resonance frequencies Fr of the membranes; and an envelope or modulation frequency Fm depending on the application. For example, a haptic feedback device may use a carrier frequency at 40 kHz which is amplitude modulated by a modulation frequency at 200 Hz. It can also be envisaged to use more than two frequencies, or even a bandwidth of frequencies, e.g. including resonance frequencies of the respective transducers.

In some embodiments, the driving signals comprise a carrier frequency above ten kHz, e.g. tens or hundreds of kHz with a modulation at least a factor ten lower, e.g. below 800 Hz. Without being bound by theory, it is noted that sound intensities which would be needed in order to induce haptic feedback in a linear sense (i.e. using sound frequencies below 800 Hz directly) would be so high that this could lead to deafness. Also, because the wavelength of the sound is large at these low frequencies (6.8 m (50 Hz) 0.4 m (800 Hz)), it means a very large transducer (many wavelengths in size) would be needed to generate the sound with any efficiency. Also, to produce these frequencies with an array of transducers the focal spot size would at best be in the order of a wavelength: that means 0.4-6.8 m in lateral width. Thus there would be little selectivity of what part of the body is excited.

Figure 3A:
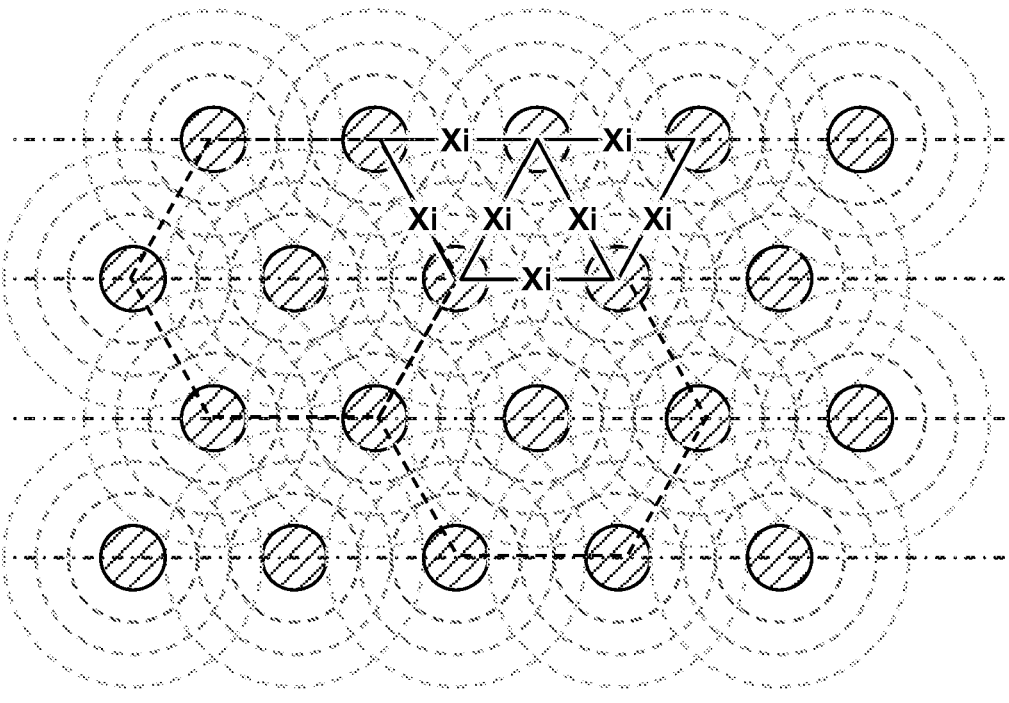
FIGS. 3A and 3B illustrates respective top views acoustic membrane arrays.
Figure 3B:
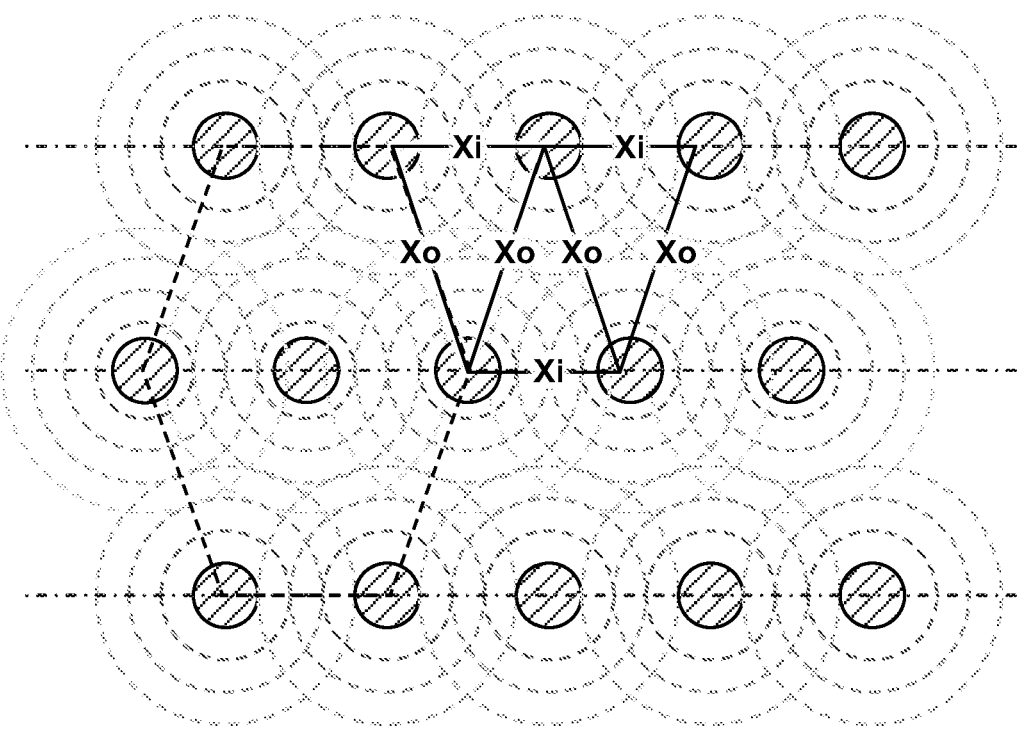

FIG. 3A illustrates a top view of an array exclusively comprising in-phase acoustic membranes. FIG. 3B illustrates a top view of an array comprising a mix of in-phase acoustic membranes along respective rows of the array, and phase-delayed membranes between the rows. In some embodiments, an array of acoustic membranes is provided wherein each of the adjacent (closest) pairs of membranes are designed to vibrate in-phase with each other. For example, in the configuration shown each of the membranes can be at a predetermined distance Xi from the (closest) adjacent membrane, which may be the same distance as shown, or a variable distance, e.g. a different integer number of wavelengths within a row than between the rows (not shown). In other or further embodiments, e.g. as shown, the acoustic membranes are configured in a hexagonal pattern wherein each of the corners of the hexagon is occupied by a membrane, and a membrane is disposed at the center of the hexagon. This can also be described as a triangular pattern wherein the membranes are disposed at the corners of the triangle. Typically, the triangles are isosceles triangles, e.g. wherein the distance (e.g. Xo) from one membrane to at least two adjacent membranes is the same (e.g. providing the same phase difference). This is the case for both FIGS. 3A and 3B. As a special case, the membranes can be disposed in a pattern of equilateral hexagons or equilateral triangles, e.g. as shown in FIG. 3A. Also other patterns are possible, as will be described in the following.

Figure 4A:
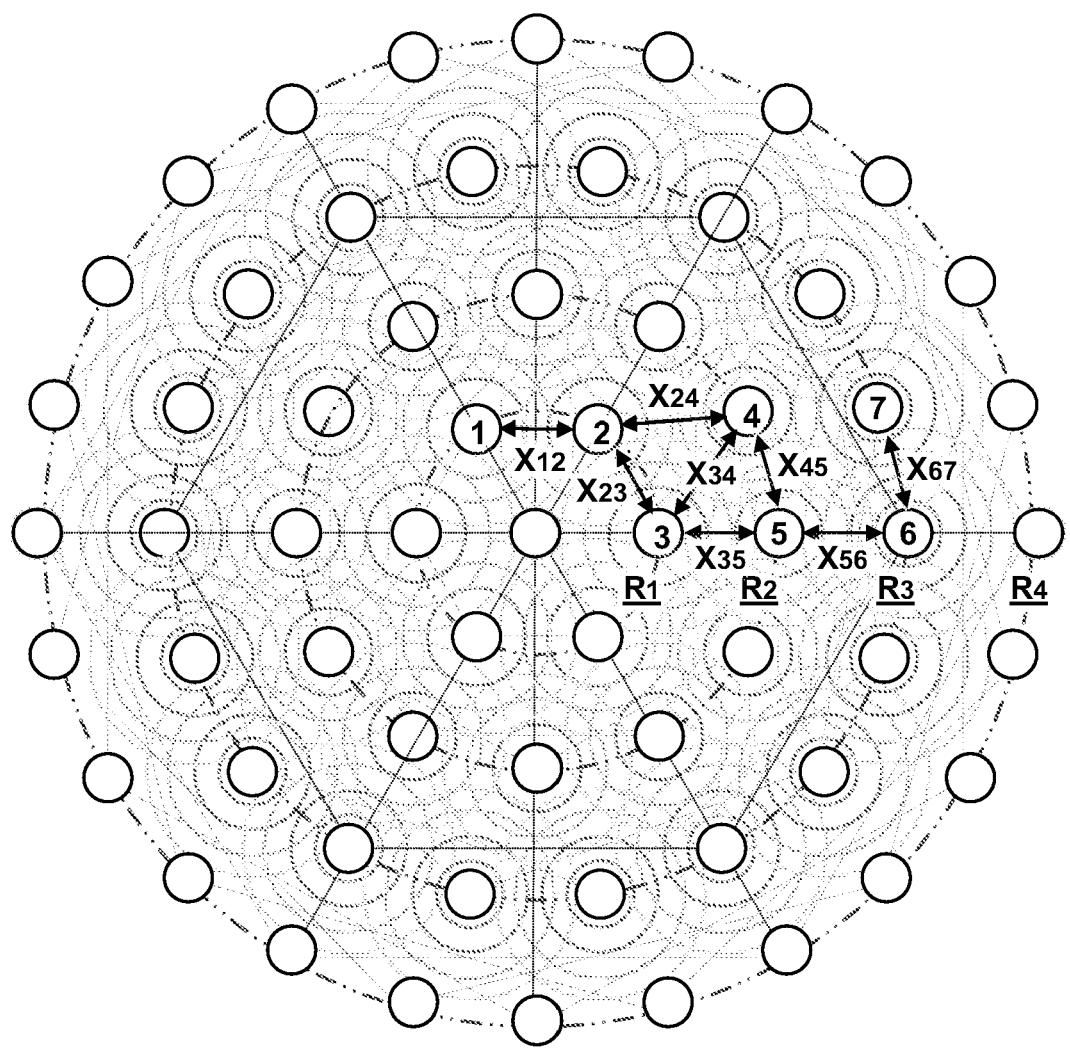
FIG. 4A illustrates a top view of membranes arranged along a pattern of concentric circles.
Figure 4B:
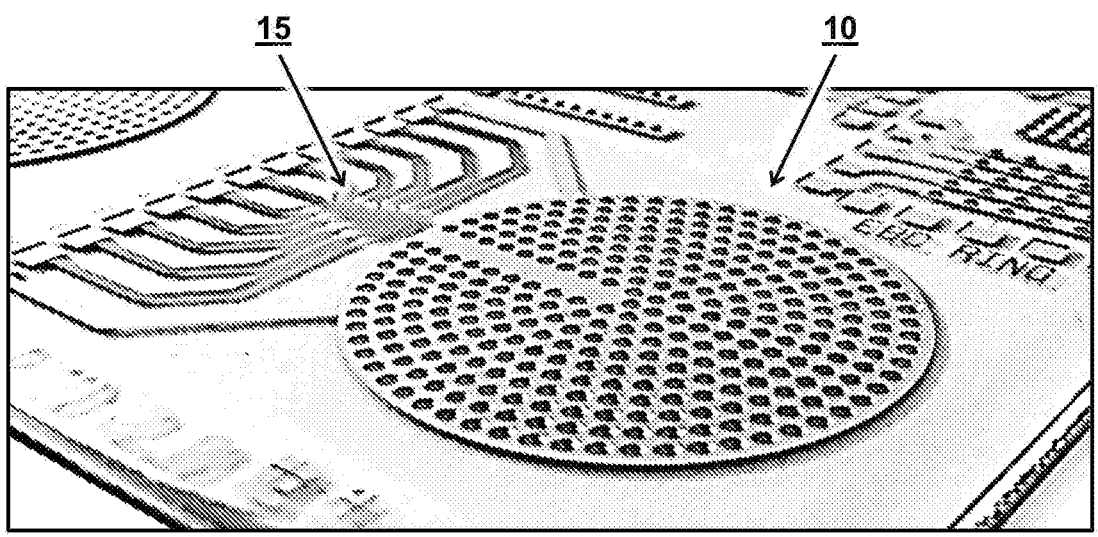
FIG. 4B illustrates a photograph of an actual device with similar pattern.

FIG. 4A illustrates a top view of membranes arranged along a pattern of concentric circles R1,R2,R3,R4. FIG. 4B illustrates a photograph of an actual device with similar pattern.

In a preferred embodiment, the acoustic membranes are arranged along a pattern of concentric circles R1,R2,R3,R4. In some embodiments, at least a subset, preferably all, of adjacent membranes 1,2;2,3 on the same circle R1 form in-phase pairs configured to vibrate with the same phase. For example, each in-phase pair has a respective first distance X12,X23 there between to provide constructive interference of lamb waves traveling over said first distance through an intermediate section of foil and arriving at the adjacent in-phase membrane. In other or further embodiments, at least a subset, preferably all, of adjacent membranes 2,4;3,4 on the neighboring circles R1,R2 form phase-delayed pairs configured to vibrate with a predetermined phase difference. For example, each phase-delayed pair has a respective second distance X24,X34 there between to provide constructive interference of lamb waves traveling over said second distance through an intermediate section of foil and arriving at the adjacent phase-delayed membrane.

In some embodiments, e.g. as shown, at least some adjacent membranes 3,4 and 3,5 on the neighboring circles R1,R2 form phase-delayed pairs with different distances X34 and X35 there between. For example, the distances differ by an integer number of wavelengths. In one embodiment, each of the membranes 1,2,3 on a first circle R1 are configured to vibrate with a first phase. In another or further embodiment, each of the membranes 4,5 on a second circle R2, adjacent to the first circle R1, are configured to vibrate with a different, second phase. In another or further embodiment, each of the membranes 6,7 on a third circle R3, adjacent to the second circle R2, are configured to vibrate with a third phase. In some embodiments, a phase delay between the first and second phases is different from a phase delay between the second and third phases. For example, the phase delays can be determined such that the respective delay compensates a different distance (through the air) to a common focal point C as described e.g. with reference to FIG. 2.

As described before, in some embodiments, a small fractional difference from the ideal case of an integer number of wavelengths may be allowed, e.g. plus or minus the fraction d12 as indicated earlier. For example, a fraction d12 of less than one tenth may correspond to only minimal destructive interference. On the one hand, the smaller the fraction d12, the less undesired cross-talk/destructive interference between adjacent pairs. On the other hand, allowing the small fraction d12 may provide greater design freedom of different configurations.

In a preferred embodiment, e.g. as shown, the acoustic membranes form a regular pattern. In one embodiment, e.g. as shown, the concentric circles R1-R4 each comprise an integer multiple of six membranes equidistantly distributed around the respective circle. For example, the first circle comprises six membranes, the second circle comprises twelve membranes, the third circle comprises eighteen membranes et cetera. There can also be a single membrane disposed at the center, as shown. Of course also other patterns are possible, e.g. other multiples than six can be used, membranes may be omitted at specific locations (as shown in the next figure), or entirely different patterns can be envisaged.

Figure 5A:
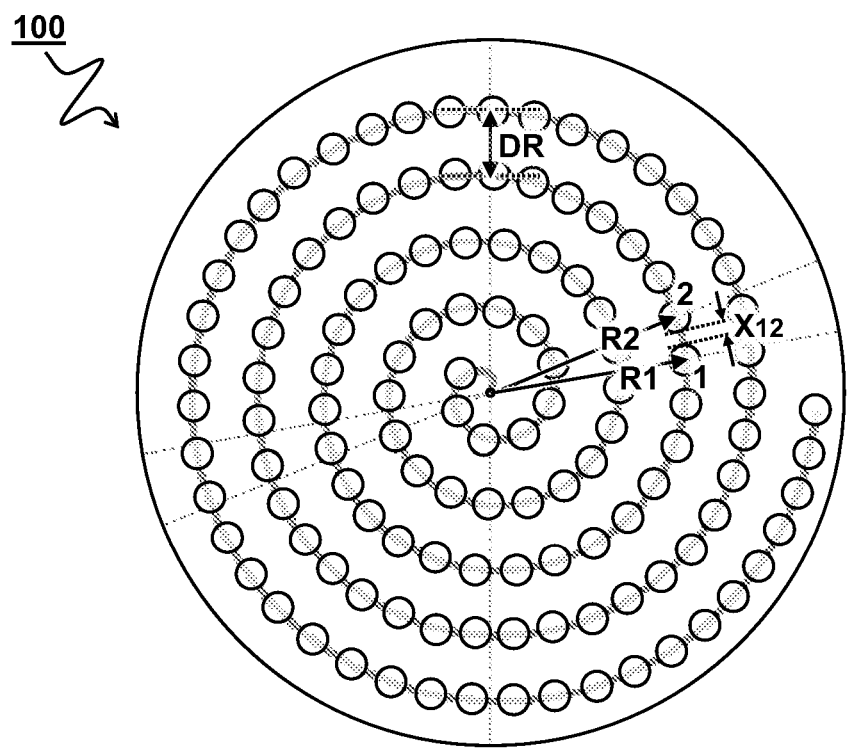
FIG. 5A illustrates an acoustic device with membranes distributed along a spiraling pattern.
Figure 5B:
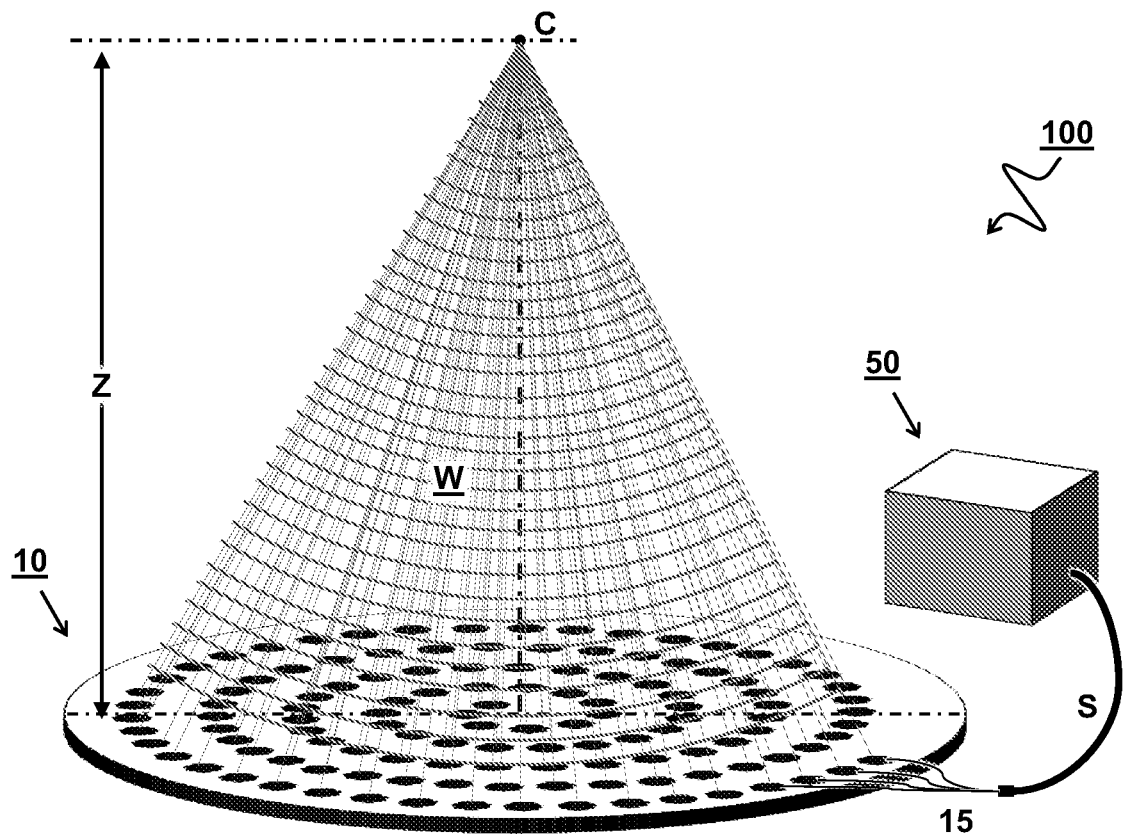
FIG. 5B illustrates a corresponding isometric view of the device generating acoustic waves to form a focal point.

FIG. 5A illustrates an acoustic device 100 with membranes distributed along a spiraling pattern. FIG. 5B illustrates a corresponding isometric view of the device generating acoustic waves W to form a focal point C. In one embodiment, e.g. as shown, the membranes in the array are arranged along a spiral pattern. Advantageously, a fixed or variable distance X12 can be used between each of the subsequent membranes along the spiral. For example, the distance X12 may be selected in accordance with a phase difference between the subsequent membranes due to the difference in respective path length to a common focal point C. For example, the difference in path length can be calculated from the difference in radius R1,R2 and the axial distance Z, e.g. using Pythagorean theorem. In some embodiments, the spiral pattern can be determined in accordance with an Archimedean spiral wherein the distance DR between subsequent windings is constant. In other or further embodiments, the distance DR may be varied, e.g. in accordance with a desired phase delay between subsequent windings.

Figure 6A:
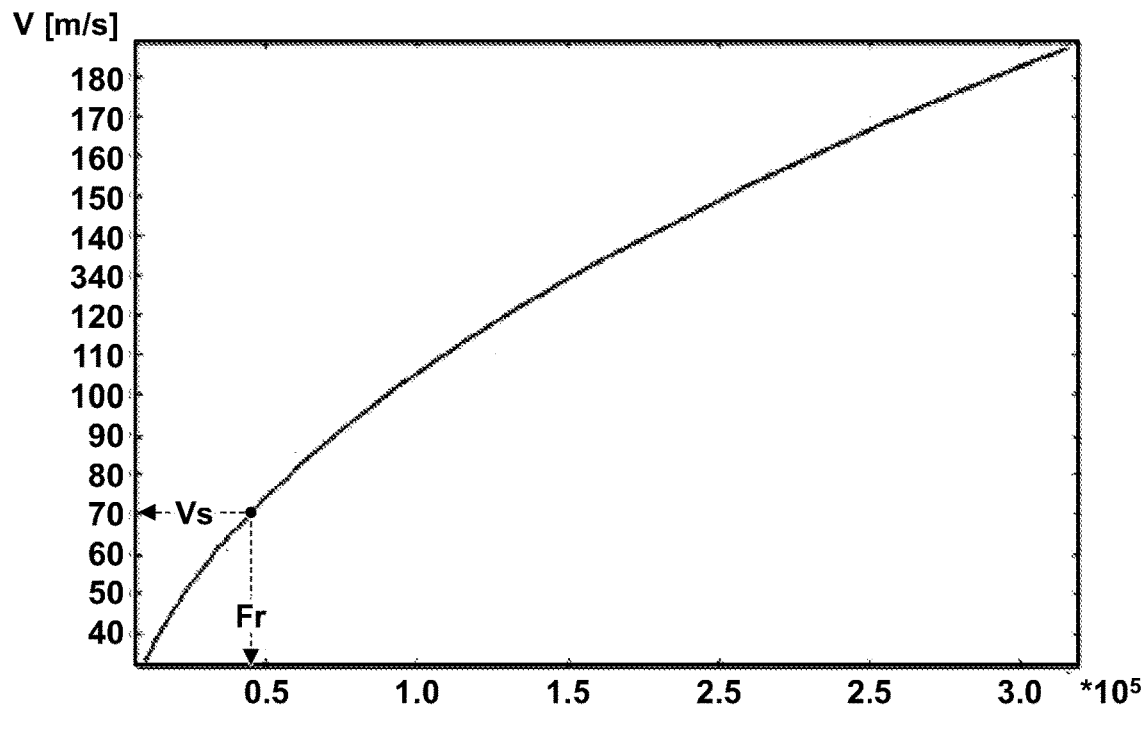
FIG. 6A illustrates a lamb wave dispersion curve for a typical substrate (foil) used to construct membrane arrays.

FIG. 6A illustrates a lamb wave dispersion curve for a typical substrate (foil) used to construct membrane arrays. For example, at a typical resonance frequency of Fr=40 kHz, the lamb wave velocity in the substrate Vs=70 m/s. In this case the lamb wavelength in the substrate $\lambda s$=1.75 mm.

Figure 6B:
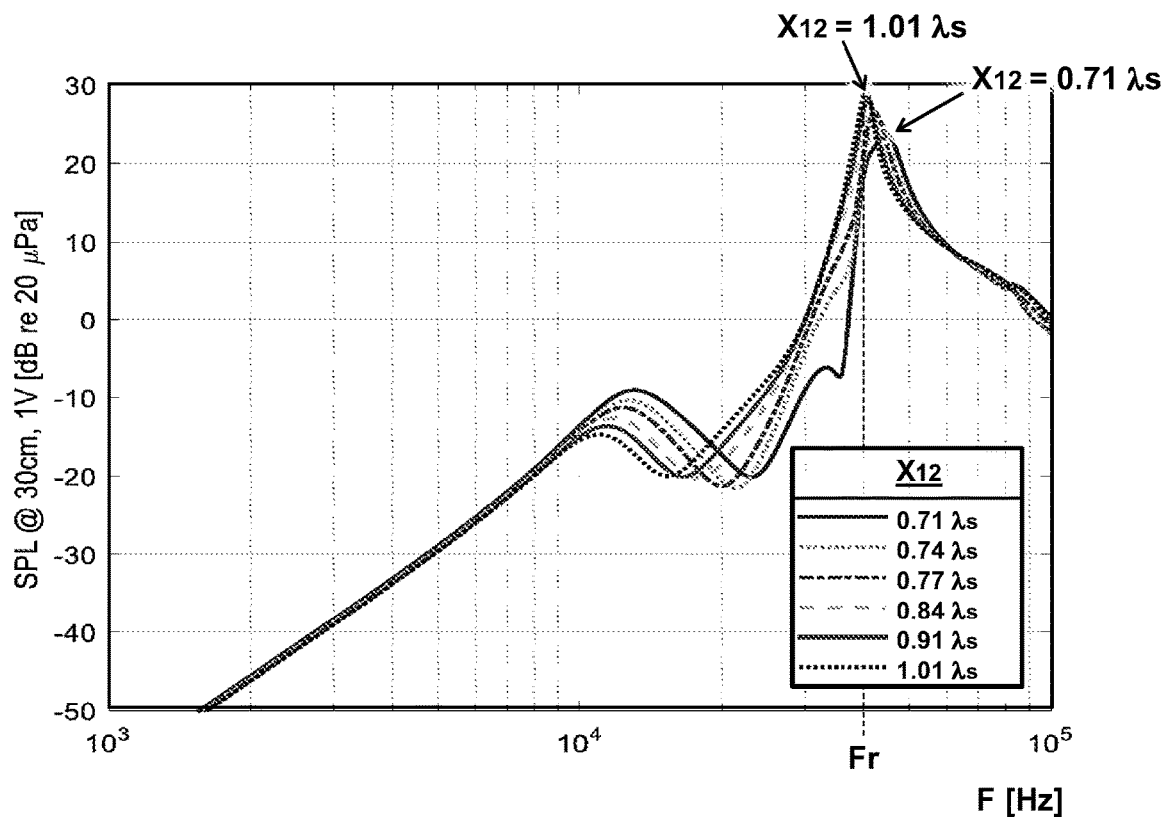
FIG. 6B illustrates a graph of sound pressure level produced by an array of transducers as a function of frequency for various distances between the transducers.

FIG. 6B illustrates a graph of sound pressure level (SPL) produced by an array of transducers as a function of frequency (F) for various distances X12 between the transducers. It may be observed that for the resonance frequency of 40 kHz, an optimum sound pressure level can be obtained using a distance X12=1.01·$\lambda s$, i.e. close to an integer number of wavelengths here N12=1, within a fraction of d12=±0.01. Note that the scale is in decibel (dB), i.e. logarithmic. Without knowledge of the invention, it will be surprising to find that for a higher density of transducers, e.g. smaller distance X12=0.71·$\lambda s$, a lower peak SPL is obtained. For X12=0.91·$\lambda s$ the SPL peak is only slightly less intense but there may be further effects that can still negatively affect performance.

In some embodiments, e.g. as shown, it may be noted that the SPL peaks for deviating values of X12 (i.e. not the ideal integer number of wavelengths), are not only smaller but can also be shifted in frequency. For example, the peaks for X12<$\lambda s$ are shifted to a higher frequency away from the actual resonance frequency (Fr) of the membranes. Without being bound by theory, the lower wavelength corresponding to the higher (off-resonance) frequency may better fit the distance between the transducers. Undesired shifting of the frequency away from the intended resonance frequency can lead to further issues. For example, if different transducers vibrate at different frequencies, this can lead to periodic destructive interference. Accordingly, it is most preferable that all transducers have the same resonance frequency Fr and/or measures are taken to periodically reset the phases of the transducers before they loose synchronicity.

For the purpose of clarity and a concise description, features are described herein as part of the same or separate embodiments, however, it will be appreciated that the scope of the invention may include embodiments having combinations of all or some of the features described. While some embodiments described herein refer to a device configured to form of a single focal point, also other shapes can be produced, e.g. a straight line, or curved line of focal points. It can also be envisaged to provide a variable focal point, line, or other shape, depending on respective phases of the driving signal. Elements of the acoustic membranes or foil may be combined or split up into one or more alternative components. The various elements of the embodiments as discussed and shown offer certain advantages, such as improved efficiency of an acoustic array. Of course, it is to be appreciated that any one of the above embodiments or processes may be combined with one or more other embodiments or processes to provide even further improvements in finding and matching designs and advantages. It is appreciated that this disclosure offers particular advantages to an array of acoustic membranes formed on or in a relatively thin, e.g. flexible foil or substrate, and in general can be applied for any application for reducing cross-talk between acoustic transducers in an array formed on a substrate or otherwise.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. An acoustic device comprising:
   an array of acoustic membranes formed on a foil; and
   a controller configured to generate respective driving signals to vibrate acoustic membranes of the array of acoustic membranes at a respective resonance frequency for generating respective acoustic waves,
   wherein at least a first subset of the array is formed by in-phase pairs of adjacent acoustic membranes connected to receive a same driving signal from the controller,
   wherein each one of the in-phase pairs comprises a first acoustic membrane and a second acoustic membrane adjacent the first acoustic membrane,
   wherein the first acoustic membrane is distanced from the second acoustic membrane by a first intermediate section of the foil there between,
   wherein a first distance of the first intermediate section between the first acoustic membrane and the second acoustic membrane is a first integer number, plus-or-minus a first fraction of less than one-tenth, times a predetermined lamb wavelength of lamb waves generated by acoustic membranes of the array of acoustic membranes at the respective resonance frequency traveling through the first intermediate section between the first acoustic membrane and the second acoustic membrane adjacent the first acoustic membrane.

2. The device according to claim 1, wherein at least a second subset of the array is formed by phase-delayed pairs of adjacent acoustic membranes connected to receive phase-delayed driving signals from the controller,
   wherein each one of the phase-delayed pairs comprises a third acoustic membrane and a fourth acoustic membrane adjacent the third acoustic membrane,
   wherein the third acoustic membrane is distanced from the fourth acoustic membrane by a second intermediate section of the foil there between,
   wherein a second distance of the second intermediate section between the third acoustic membrane and the fourth acoustic membrane is a second integer number, plus-or-minus a non-zero, second fraction, times a predetermined lamb wavelength of lamb waves generated by acoustic membranes of the array of acoustic membranes at the respective resonance frequency traveling through the third intermediate section between the third acoustic membrane and the fourth acoustic membrane adjacent the third membrane,
   wherein the second fraction is predetermined in accordance with a phase delay between the third acoustic membrane and the fourth acoustic membrane.

3. The device according to claim 2, wherein zero or non-zero phase delays between respective acoustic membranes of acoustic membrane pairs of the array of acoustic membranes are determined such that respective acoustic waves generated by acoustic membranes of the respective acoustic membranes of acoustic membrane pairs constructively interfere at a focal point above the array.

4. The device according to claim 2, wherein acoustic membranes forming a respective pair of the phase-delayed pairs of adjacent membranes are disposed at respective distances $Z_3$ and $Z_4$ from a common focal point above the foil,
   wherein the distances $Z_3$ and $Z_4$ are determined as follows:

$Z_3=(N_3+\Delta\Phi_3/2\pi)\cdot\lambda_a$ and $Z_4=(N_4+\Delta\Phi_4/2\pi)\cdot\lambda_a$, where $\lambda_a$ is a wavelength of acoustic waves generated by the membranes, $N_3$ and $N_4$ are integers values determined by a number of full wavelengths fitting between respective membranes of a phase-delayed pair of adjacent membranes and the focal point, and $\Delta\Phi_3$ and $\Delta\Phi_4$ are respective phases of the membranes;
   wherein a distance $X_{34}$ between the phase delayed-pair of membranes is determined as follows:

$X_{34}=(N_{34}+\Delta\Phi_{34}/2\pi)\cdot\lambda_s$, where $\lambda_s$ is the lamb wavelength, $N_{34}$ is an integer value determined by a number of full wavelengths fitting between the respective membranes of the phase-delayed pair of adjacent membranes and the focal point, and $\Delta\Phi_{34}$ is a phase difference between the respective phase delayed-pair of membranes;
   wherein the distance $X_{34}$ is selected such that:
   $(\Delta\Phi_{34}/2\pi)=|(\Delta\Phi_3/2\pi)-(\Delta\Phi_4/2\pi)|\pm d_{34}$,
   where $d_{34}$ is a maximum allowed fractional phase difference with a value of less than one-tenth.

5. The device according to claim 1, wherein each of the driving signals generated by the controller comprise a respective driving frequency corresponding to the resonance frequency of respective acoustic membranes of the array of acoustic membranes.

6. The device according to claim 1, wherein acoustic membranes of the array of acoustic membranes are arranged along a pattern of concentric circles,
   wherein at least a subset of adjacent membranes on a same circle of the pattern of concentric circles form the in-phase pairs configured to vibrate with a same phase,
   wherein each in-phase pair has the first distance there between to provide constructive interference of lamb waves traveling over the first distance through the first intermediate section of the foil and arriving at the adjacent in-phase membrane.

7. The device according to claim 6, wherein at least a subset of adjacent membranes on neighboring circles of the pattern of concentric circles form phase-delayed pairs configured to vibrate with a predetermined phase difference,
   wherein each one of the phase-delayed pairs comprise a third acoustic membrane and a fourth acoustic membrane adjacent the third acoustic membrane,
   wherein the third acoustic membrane is distanced from the fourth acoustic membrane by a second intermediate section having a second distance there between to provide constructive interference of lamb waves traveling over the respective second distance through the second intermediate section of the foil.

8. The device according to claim 7, wherein at least some adjacent membranes on neighboring circles of the pattern of concentric circles form ones of the phase-delayed pairs with different second distances there between,
   wherein the different second distances differ by an integer number of wavelengths.

9. The device according to claim 1, wherein acoustic membranes of the array of acoustic membranes are formed as an integral part of the foil, wherein an actuated surface of acoustic membranes of the array of acoustic membranes comprises a layer of the foil.

10. The device according to claim 1, wherein the resonance frequency is determined, by one or more of the membrane material properties and diameter of acoustic membranes of the array of acoustic membranes,
    wherein the lamb wavelength is determined by the resonance frequency at which the lamb waves are generated, material properties, and thickness of the first intermediate sections of the foil, wherein the first intermediate sections of the foil have a total thickness of less than one millimeter, and wherein acoustic membranes of the array of acoustic membranes have a total thickness that is at least a factor two lower than the thickness of the first intermediate sections of the foil.

11. A method of manufacturing an acoustic device comprising an array of acoustic membranes formed on a foil, the method comprising:
determining a layout for the array of acoustic membranes, wherein each acoustic membrane of the array of acoustic membranes is configured to vibrate at a resonance frequency of acoustic membranes of the array of acoustic membranes for generating respective acoustic waves;
determining relative phases at which acoustic membranes of the array of acoustic membranes are to be actuated for generating a predetermined interference pattern between the respective acoustic waves;
determining a lamb wavelength of lamb waves at the resonance frequency traveling through intermediate sections of the foil between adjacent acoustic membranes in the array;
wherein distances of the intermediate sections between the adjacent acoustic membranes of pairs of adjacent acoustic membranes in the layout are determined in accordance with:
the relative phases at which acoustic membranes of the array of acoustic membranes are to be actuated, and
the lamb wavelength for having the lamb waves, generated by actuating a first acoustic membrane of a pair of adjacent acoustic membranes and traveling through the respective intermediate section, arrive in-phase with a second acoustic membrane of the pair of adjacent acoustic membranes.

12. The method according to claim 11, wherein at least a first subset of the array is formed by in-phase pairs of adjacent acoustic membranes,
wherein each one of the in-phase pairs comprises a first acoustic membrane and a second acoustic membrane adjacent the first acoustic membrane,
wherein the first acoustic membrane is distanced from the second acoustic membrane by a first intermediate section of the foil there between,
wherein a first distance of the first intermediate section between the first acoustic membrane and the second acoustic membrane is a first integer number, plus-or-minus a first fraction of less than one-tenth, times a predetermined lamb wavelength of lamb waves generated by acoustic membranes of the array of acoustic membranes at the respective resonance frequency traveling through the intermediate section between the first acoustic membrane and the adjacent second acoustic membrane adjacent the first acoustic membrane.

13. The method according to claim 12, wherein at least a second subset of the array is formed by phase-delayed pairs of adjacent acoustic membranes,
wherein each one of the phase-delayed pairs comprises a third acoustic membrane and a fourth acoustic membrane adjacent the third acoustic membrane,
wherein the third acoustic membrane is distanced from the fourth acoustic membrane by a second intermediate section of the foil there between,
wherein a second distance of the second intermediate section between the third acoustic membrane and the fourth acoustic membrane is a second integer number, plus-or-minus a non-zero, second fraction, times a predetermined lamb wavelength of lamb waves generated by acoustic membranes of the array of acoustic membranes at the respective resonance frequency traveling through the intermediate section between the third acoustic membrane and the fourth acoustic membrane adjacent the third acoustic membrane,
wherein the second fraction is predetermined in accordance with a phase delay between the third acoustic membrane and the fourth acoustic membrane.

14. The method according to claim 11, wherein a thickness of intermediate sections of the foil between respective pairs of acoustic membranes is varied to cause a resulting propagation of lamb waves such that lamb waves generated by one acoustic membrane of a respective pair of acoustic membranes, arrive in-phase with lamb waves generated by an adjacent other acoustic membrane of the respective pair.

15. The method according to claim 11, wherein acoustic membranes of the array of acoustic membranes are arranged along a spiral pattern.

16. The method according to claim 13, wherein zero or non-zero phase delays between respective pairs of acoustic membranes are determined such that respective acoustic waves generated by acoustic membranes of the array of acoustic membranes constructively interfere at a focal point above the array.

17. The method according to claim 13, wherein acoustic membranes forming a respective pair of the phase-delayed pairs of adjacent membranes are disposed at respective distances $Z_3$ and $Z_4$ from a common focal point above the foil,
wherein the distances $Z_3$ and $Z_4$ are determined as follows:

$$Z_3 = (N_3 + \Delta\Phi_3/2\pi) \cdot \lambda_a \text{ and } Z_4 = (N_4 + \Delta\Phi_4/2\pi) \cdot \lambda_a,$$

where $\lambda_a$ is a wavelength of acoustic waves generated by the membranes, $N_3$ and $N_4$ are integers values determined by a number of full wavelengths fitting between respective membranes of a phase-delayed pair of adjacent membranes and the focal point, and $\Delta\Phi_3$ and $\Delta\Phi_4$ are respective phases of the membranes;
wherein a distance $X_{34}$ between the phase delayed-pair of membranes is determined as follows:

$$X_{34} = (N_{34} + \Delta\Phi_{34}/2\pi) \cdot \lambda_s,$$

where $\lambda_s$ is the lamb wavelength, $N_{34}$ is an integer value determined by a number of full wavelengths fitting between the respective membranes of the phase-delayed pair of adjacent membranes and the focal point, and $\Delta\Phi_{34}$ is a phase difference between the respective phase delayed-pair of membranes;
wherein the distance $X_{34}$ is selected such that:

$$(\Delta\Phi_{34}/2\Phi) = |(\Delta\Phi_3/2\Phi) - (\Delta\Phi_4/2\Phi)| \pm d_{34},$$

where $d_{34}$ is a maximum allowed fractional phase difference with a value of less than one-tenth.

18. The method according to claim 11, wherein acoustic membranes of the array of acoustic membranes are arranged along a pattern of concentric circles,
wherein at least a subset of adjacent membranes on a same circle of the pattern of concentric circles form in-phase pairs configured to vibrate with a same phase,
wherein each in-phase pair has a respective first distance there between to provide constructive interference of lamb waves traveling over the first distance through an intermediate section of the foil and arriving at the adjacent in-phase membrane, wherein at least a subset of adjacent membranes on neighboring circles of the pattern of concentric circles form phase-delayed pairs configured to vibrate with a predetermined phase difference, wherein each phase-delayed pair has a respective second distance there between to provide constructive interference of lamb waves traveling over the respective second distance through an intermediate section of the foil and arriving at the adjacent phase-delayed membrane, wherein at least some adjacent membranes on neighboring circles of the pattern of concentric circles form phase-delayed pairs with different distances there between, and wherein the different distances differ by an integer number of wavelengths.

19. The device according to claim 1, wherein acoustic membranes of the array of acoustic membranes in the array are arranged along a spiral pattern.

20. A method of controlling an acoustic device comprising an array of acoustic membranes formed on a foil, the method comprising:

generating respective driving signals to vibrate acoustic membranes of the array of acoustic membranes at a respective resonance frequency for generating respective acoustic waves, wherein at least a first subset of the array forms in-phase pairs of adjacent acoustic membranes receiving a same driving signal, wherein each one of the in-phase pairs comprises a first acoustic membrane and a second acoustic membrane adjacent the first acoustic membrane, wherein the first acoustic membrane is distanced from the second acoustic membrane by a first intermediate section of the foil there between, wherein a first distance of the first intermediate section between the first acoustic membrane and the second acoustic membrane is a first integer number, plus-or-minus a fraction of less than one-tenth, times a predetermined lamb wavelength of lamb waves generated by acoustic membranes of the array of acoustic membranes at the respective resonance frequency traveling through the intermediate section between the first acoustic membrane and the second acoustic membrane adjacent the first acoustic membrane.

\* \* \* \* \*